United States Patent [19]
Bateson et al.

[11] Patent Number: 6,059,369
[45] Date of Patent: May 9, 2000

[54] COMPOSITE VEHICLE SEAT BACK FRAME AND METHOD OF MANUFACTURING THEREOF

[75] Inventors: Daniel J. Bateson, Ferndale; Stephen Lambrecht, New Hudson; John P. Slaven, Harper Woods, all of Mich.

[73] Assignee: Lear Corporation, Southfield, Mich.

[21] Appl. No.: 08/846,657

[22] Filed: May 1, 1997

[51] Int. Cl.[7] .................................................. A47C 7/02
[52] U.S. Cl. ................................ 297/452.18; 297/DIG. 1
[58] Field of Search ............................ 297/452.18, 452.2, 297/DIG. 1, 451.9, 452.1, 445.1, 463.2, DIG. 2

[56] References Cited

U.S. PATENT DOCUMENTS

| | | |
|---|---|---|
| 5,013,089 | 5/1991 | Abu-Isa et al. ................. 297/452.2 X |
| 5,127,443 | 7/1992 | Ducamp et al. . |
| 5,490,602 | 2/1996 | Wilson et al. . |
| 5,540,260 | 7/1996 | Mood . |

*Primary Examiner*—Milton Nelson, Jr.
*Attorney, Agent, or Firm*—Brooks & Kushman P.C.

[57] ABSTRACT

Lightweight, cost-effective composite seat back frames comprise braided carbon fiber reinforced attachment portions connected by braided, glass fiber-reinforced, generally U-shaped back portions, all these portions impregnated with a polymeric matrix resin. One or more of the braided glass or carbon fiber portions are preferably woven by a multiaxial weaving machine to maximize composite properties. The braids may be woven around a permanent or removable mandrel, and may contain pivot bushings or seat articulation hardware. The seat back frames thus produced are lighter than their aluminum counterparts.

11 Claims, 3 Drawing Sheets

COMPOSITE VEHICLE SEAT BACK FRAME AND METHOD OF MANUFACTURING THEREOF

TECHNICAL FIELD

This invention pertains to vehicular seating components. More particularly, the invention pertains to low cost, low mass seat back frames prepared from fiber-reinforced composite materials.

BACKGROUND ART

In recent years, vehicle seat designs have become a very important vehicle marketing feature. Vehicle seats of increasing adjustability and functionality and improved comfort have added great complexity to the design process. Additionally, universal adjustment capability as well as Lumbar support adjustability features have increased assembly costs and further complicated design.

The desire for universal adjustability, Lumbar support features, and improved comfort and aesthetic appeal has contrasted with the general movement in the industry toward weight reduction for improved economy. Vehicle seat designers are now required to provide the above-referenced features while reducing weight of the seat assembly and without increasing manufacturing costs.

Typically, steel or aluminum seat frames are used in the seat assembly. In many current designs, an extruded aluminum tube is bent to form the seat back frame. Although aluminum frames can be lightweight, the range of back frame shapes available is limited. Moreover, the shape of back frame in conjunction with the hollow nature of the raw material steel or aluminum tube requires an expensive bending operation in order to avoid buckling or creating points of weakness in the bent frame.

Glass fiber and carbon fiber reinforced composite structures have high strength-to-weight ratios, carbon fiber composites particularly so. However, carbon fiber composites have generally been too expensive for use in vehicle seat back frames. Glass fiber composites are much less expensive than those reinforced with carbon fibers, however, the lower ends of the seat back frame contain both a pivot point around which the seat back pivots in the fore and aft directions, as well as an attachment point for the seat back adjusting mechanism. Glass fiber composites, unless made of heavy cross-section, cannot support the required loads at these points of stress concentration. Increasing the sectional thickness of a glass fiber composite frame would increase both the weight and the cost to the extent that such a frame could not compete with an aluminum frame.

Accordingly, it is desirable to provide a vehicle seat back frame with reduced weight, and with increased structural configuration ranges, without significantly increasing costs.

SUMMARY OF THE INVENTION

It has now been discovered that a lightweight, cost-effective, and yet robust seat back frame may be prepared by constructing the generally U-shaped back portion from cost effective and high strength fiberglass reinforced composite material, while manufacturing the lowermost opposing ends of the frame from a composite structure comprising carbon reinforcing fibers, most preferably both carbon fibers and glass fibers. The resulting seat back frame combines the low cost of fiberglass reinforced composite materials with the high strength of carbon fiber reinforced materials without incurring a significant cost penalty.

DESCRIPTION OF THE PREFERRED EMBODIMENTS

Figure 1:
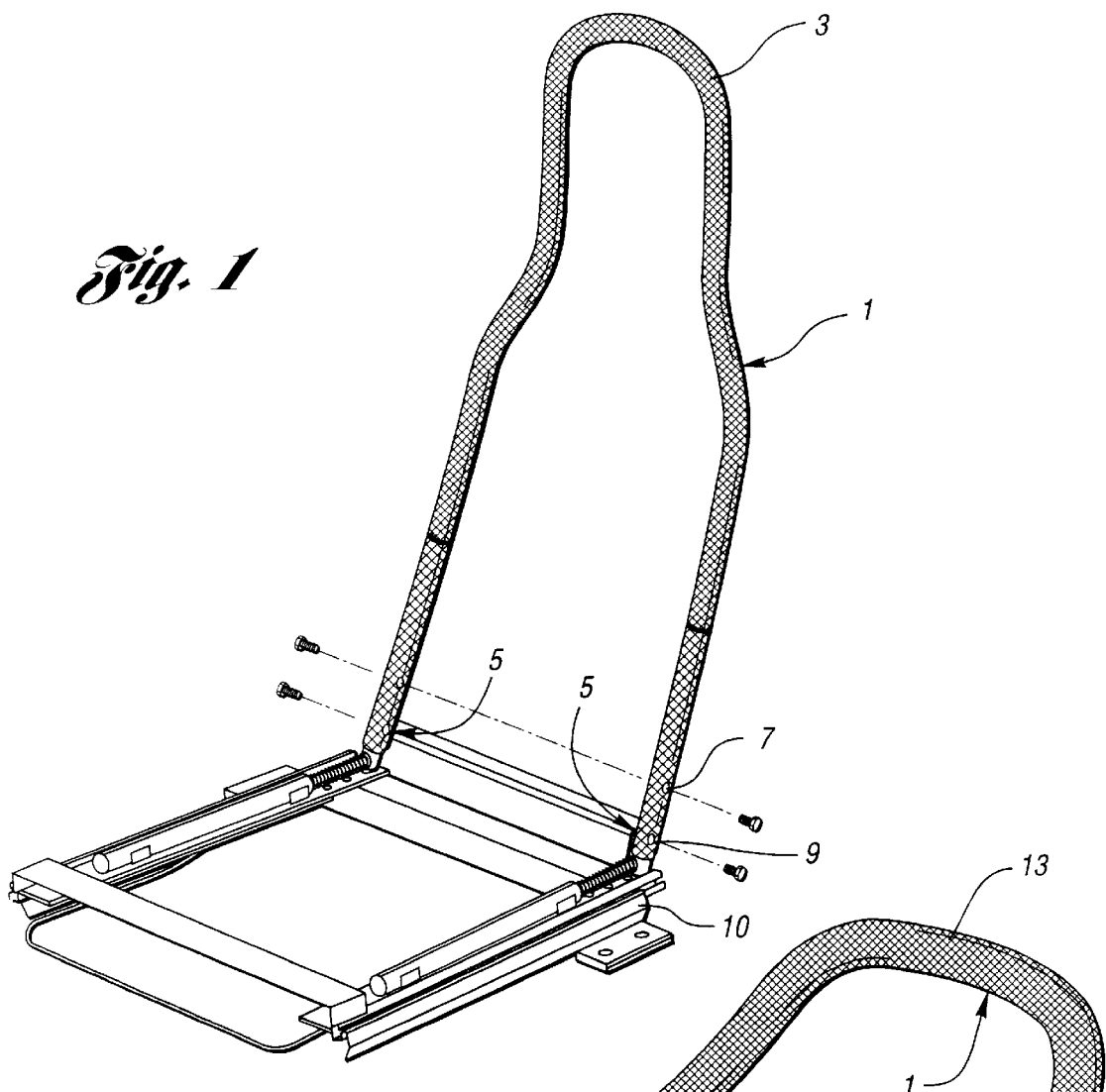
FIG. 1 illustrates generally a modular seat containing a generally U-shaped back frame.

The composite seat back frame of the subject invention is a generally U-shaped component, the interior end of the "U" providing support for the top and sides of the seat back, while the opposing ends contain pivot points defining seat back tilt as well as points for attachment of seat movement devices. The general construction of a modular seat may be illustrated with respect to FIG. 1. In FIG. 1, at 1 is the generally U-shaped seat frame, and 3 is the bend forming the support for the top of the seat, while at 5 are the opposing ends which will be located near the base of the seat. At 7 are the pivot points for the seat back, while at 9 is located an adjustment attachment means for seat back movement controls. The frame's pivot point and adjustment attachment means are connected respectively to seat base portion 10.

Figure 2:
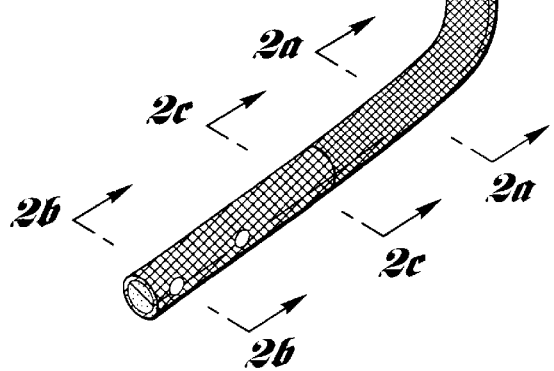
FIG. 2 illustrates the back frame of the subject invention.

The seat back frame itself may be more particularly described with respect to FIG. 2. In FIG. 2, the seat back frame 1 is a generally U-shaped construction. However, it is noted that the actual shape of the seat back frame will be dictated by the aesthetic design of the seat back itself, and need not be a strict "U" shape. Bushing holes for the pivot points and control attachment points may be clearly seen at 6 and 8. The top portion of the frame 13 is prepared from fiberglass reinforced material, while the lower portion 15, i.e. that portion encompassing the pivot and attaching points near the opposing ends of the frame, are comprised of carbon fiber, preferably of both carbon and glass fibers. The various reinforcing fibers are united into a composite whole, preferably by means of a matrix resin of the thermosetting type, as hereinafter more fully described.

With reference to the construction of the composite frame, the frame may be constructed in various ways depending upon such factors as the anticipated length of the model run, i.e., the number of seats to be produced, the strength required of the frame, and like considerations.

For example, for both short and long production runs, it may be desirable to produce a low cost, very lightweight foam mandrel outside of which the fiber reinforcing materials and matrix resins are positioned. Low cost epoxy resin tooling may be used to produce a mold suitable for the injection of a rigid or semi-rigid low density polyurethane foam to form the mandrel. In like manner, a steam-heated or hot air-heated mold may be utilized to form a mandrel from expandable beads of thermoplastic such as expandable polystyrene, expandable polyethylene, or expandable polypropylene. Due to the light weight of these mandrels, they may be left within the seat frame, resulting in very little weight penalty. In higher production runs, or where even the small additional weight of a foam mandrel is critical to the application, a removable mandrel around which the fiber reinforcement and matrix resins are positioned may be utilized, this mandrel being removed upon completion of the structure. Such removable mandrels may be removed before impregnation of the fibrous reinforcement with the matrix resin or afterwards. In the latter case, the mandrel is frequently coated with a mold release material. A foam mandrel is shown across sections 2a—2a, 2b—2b, and 2c—2c of FIG. 2.

Figure 4:
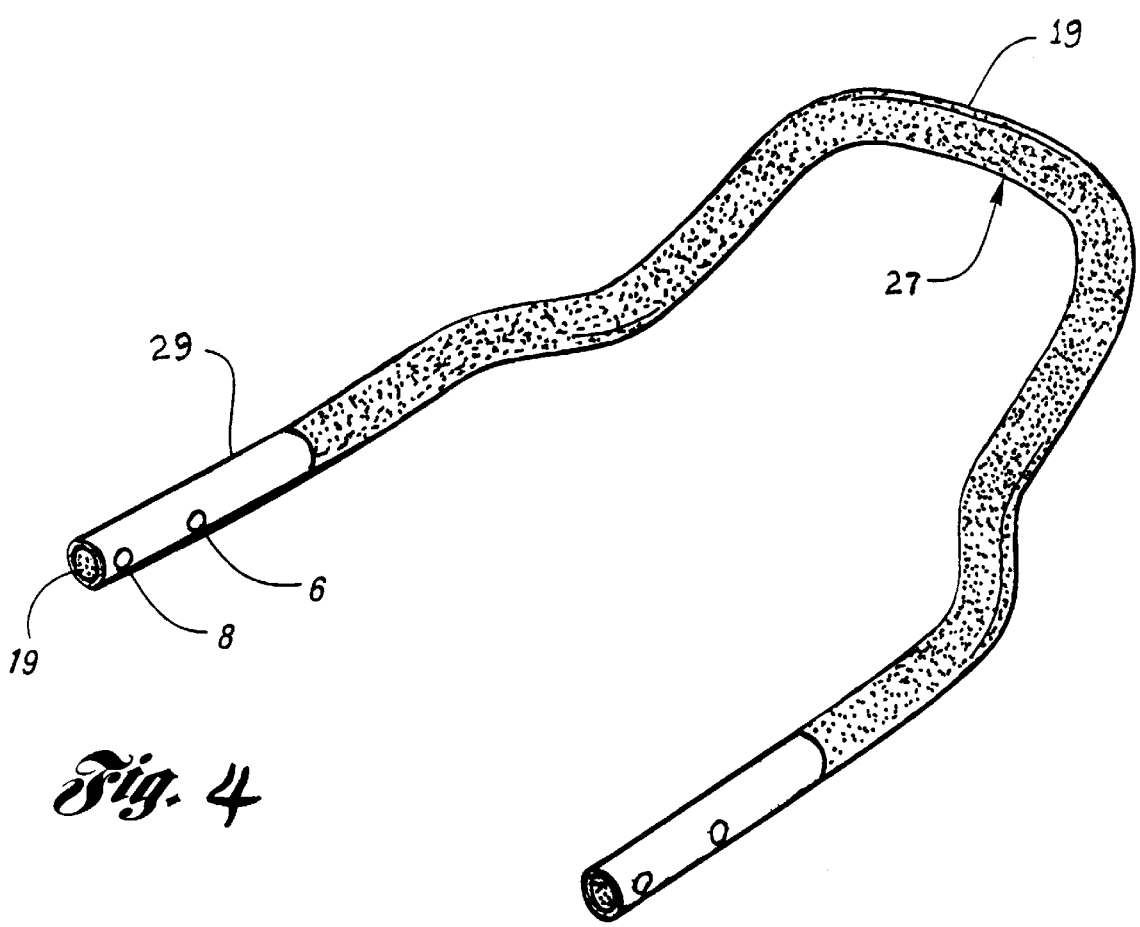
FIG. 4 illustrates a foam mandrel with tubular metal end portions.

In one preferred embodiment, illustrated by reference to FIG. 4, the mandrel 27 is molded such that at the opposing ends thereof, metal tubes 29 are molded integral with the foam 19 or later slipped over the foam. The metal tubes contain mounting holes 6, 8 as in other embodiments, but offer increased resistance to failure at these locations. The fiber reinforcement is then woven around both the foam and metal portions of the mandrel.

The lower portions of the opposing ends of the frame, i.e. those portions which comprise carbon fibers, can be formed by cutting a suitable length of carbon fiber braid material (a "sock"), and slipping it over the fiberglass braid on the mandrel. The carbon fiber braid may overlap the fiberglass braid completely along the length of the former, or there may be just sufficient overlap to allow for the production of an integral structure. Complete overlap is desired.

The foam mandrel with surrounding fiberglass and carbon fiber braids and any embedded pivot bushings, attachment bushings or other hardware, and the like, may then be inserted into a mold, and curable resin injected into the mold, wetting out the fibers, and providing upon cure, a finished composite glass and carbon reinforced structure.

Preferably, the woven reinforcement of the composite seat back frame is produced by multi-dimensional weaving techniques. In these techniques, a three-dimensional weaving or braiding machine is coupled with computer control to carefully adjust the spacing of reinforcing fiber yarns or tows in order to minimize fiber poor and fiber rich zones during the preparation of complex shapes. Thus, utilizing this technique of weaving (braiding) optimum composite properties may be achieved. Multiaxial braiding may be illustrated by U.S. Pat. Nos. 5,540,260; 5,490,602; and 5,127,443, which are herein incorporated by reference.

As with many other rather complex manufacturing processes, use of three-dimensional weaving machines adds fixed cost in the nature of computer programming to adjust the fiber weave appropriately. This fixed cost is relatively low when spread across a moderate to large size production run, but can be exorbitant when applied to one-off or other small production run quantities. In addition to preventing fiber rich and fiber starved zones in the reinforcing fiber surrounding the mandrel, three-dimensional weaving technique may also be used to alter the nature of the weave to increase strength properties in given directions. A variety of 0°, 30°, 45°, 90°, etc. fiber directions can be manipulated during the weaving process to produce tubular structures with the necessary strength characteristics to withstand the stresses likely to be encountered during service. For example, in portions where bending stress substantially orthogonal to the frame of the seat back is likely to be encountered, a higher concentration of 45° weave components may be utilized, whereas in areas where tensile strength in the plane of the seat back is required, additional 0° weave components may be inserted so as to provide greater tensile strength in this direction.

For the lower opposed ends of the generally U-shaped back frame, a triaxial or other multiaxial weaving machine may be equipped with shuttles carrying carbon fiber yarns or tows in addition to fiberglass yarns or tows. As the transition area between the fiberglass portion of the back is approached, the machine may gradually or abruptly substitute carbon fiber yarns or tows for fiberglass yarns or tows, to create the lower, carbon fiber-comprising portion of the seat back frame. However, the use of additional shuttles and creels of carbon fibers in addition to fiberglass, necessitates the use of a much more expensive weaving machine. Thus, although this type of weaving may represent the preferred method, in practice, the most useful method is to weave the entire frame of fiberglass, and then to slip a carbon fiber braid or "sock" over the lower portion of the opposing ends of the frame to provide the carbon fiber containing portion thereof. This method has the benefit of lowest cost and greatest flexibility, although it may not offer the most optimal properties with respect to strength and weight.

A matrix resin is necessary to translate the strength properties of the various fibers into the composite structure as a whole. This matrix resin may be thermoplastic matrix resin, but is preferably a thermoset matrix resin. Thermoplastic matrix resins, unless of high melting point, cannot meet minimum automotive requirements. High melting thermoplastics such as nylon, aramids, polyimides, polyetherimides, and the like tend to be relatively expensive, and thus the cost benefit ratio increases considerably if such resins are used. Thus, for most applications, thermosetting resins such as polyurethane resins, epoxy resins, curable, unsaturated polyester resins, and the like may be used. A convenient method of applying such resins is the use of resin transfer molding, or RTM. Those skilled in the art are familiar with resin transfer molding. Reference may be had to "Resin Transfer Molding," Carl F. Johnson, MANUFACTURING PROCESSES: CONSUMER PRODUCTS, pp. 564–568. For the use of resin transfer molding and other techniques, the fiber content of the finished product exclusive of any remaining mandrel, is normally between 30 and 70 volume percent, more preferably between 40 and 60 volume percent. Higher fiber volume may not provide for enough matrix resin to fully translate the fiber properties to the composite, thus resulting in a loss of properties, while fiber content below 30% will produce a composite product where the strength is proportional to the strength of the resin itself rather than to the fiber. Thus, the fiber content should be within the above-identified ranges.

One of the benefits of the resin transfer system and other low pressure molding systems is the availability of epoxy and other relatively low cost tools. Unlike high pressure reaction injection molding (RIM) tools which may easily cost greatly in excess of $200,000 per tool, resin transfer tools are relatively inexpensive. Thus, they are amenable to rapid changes even during one production run. The tool may be designed signed to incorporate metal, polymer, or composite bushings for attachment points, pivot points, and the like. These bushings may also be placed into the mold used to form foam type mandrels, thus providing the possibility of weaving material directly around such portions. During the weaving operation, the portions of the structure immediately adjacent such points may be reinforced with additional woven material at very low cost, and without appreciably lengthening the production cycle.

Figure 2A:
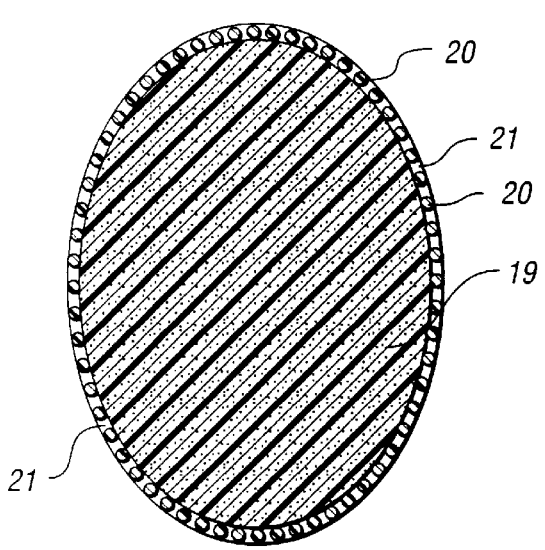
FIG. 2a is a cross-section across 2a—2a of FIG. 2.
Figure 2B:
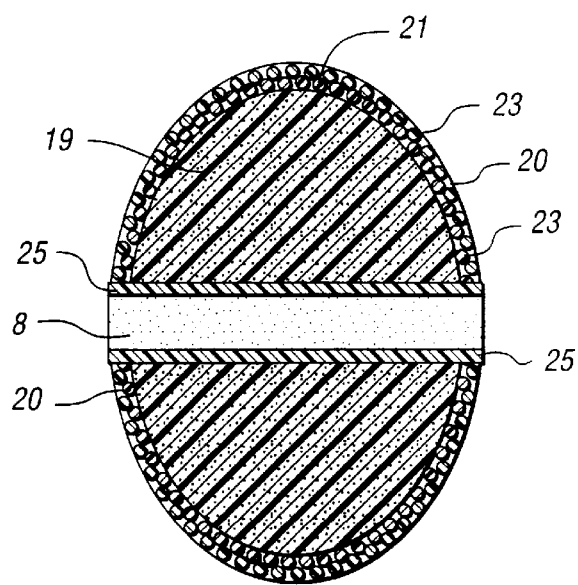
FIG. 2b is a cross-section across 2b—2b of FIG. 2.

With reference to FIG. 2a, the cross-section at 2a—2a shows at 19, the interior foam mandrel around which, in this case, the fiberglass yarns or tows 20 are initially woven. At 21 is the fiberglass encompassing matrix resin which translates the strength characteristics of the fibers to the composite. A cross-section 2b—2b is shown the same foam core 19, the woven fiber-glass yarns or tows 20, and the woven carbon fiber tows or yarns 23. The matrix resin 21 unites the fibers into an integral whole. At 25 is shown a bushing, in this case one initially located within the foam itself. It is important to note that the foam mandrel is for manufacturing only. It does not add to the strength of the section, and in many or most cases, it will be removed to reveal a hollow section.

Other methods of constructing the seat frame backs are of course possible, but these are less desirable commercially at the present time. For example, both the fiberglass and carbon fiber portions of the seat back frame may be woven with co-mingled yarn rather than purely of reinforcing fibers. Co-mingled yarn is a product wherein reinforcing fibers of carbon or glass are intermingled with sufficient thermoplastic or thermoplastic/thermoset fibers which, when placed in a suitable heated mold, flow and form the matrix resin around the reinforcing fibers. An inflatable bladder may be used to expand the composite braid against a heated mold for fiber wetting and curing. At the present time, co-mingled yarn products are relatively expensive, and thus this method is not suitable except where high costs can be tolerated. However, it may be possible that in the future, the cost of such products will be lowered and the range of thermoplastic and thermoset fibers increased as well, providing a window of opportunity for their use.

With respect to the mandrel, removable mandrels may be used where weight or other properties dictate. Such mandrels may take the place of a polymer sleeve which is inflated slightly and around which the fiberglass and/or carbon reinforcing fibers are woven, and then consolidated into a whole by a resin transfer molding or other resin injection. Following curing of the resin, the mandrel may be deflated and withdrawn from the finished structure, thereby decreasing the weight and encouraging reuse of the mandrel numerous times. While this advantage has the benefit of resulting in the lowest possible weight product, it has the disadvantages of additional processing steps and the use of a more expensive mandrel. Plaster or other breakable and removable mandrels may be used. Dissolvable mandrels may be used as well. As the current foam mandrels do not offer a great detriment in terms of weight, it is preferred that these be used in the process of the subject invention.

Having generally described this invention, a further understanding can be obtained by reference to certain specific examples which are provided herein for purposes of illustration only and are not intended to be limiting unless otherwise specified.

EXAMPLE 1

A composite seat back frame was manufactured using fiberglass and carbon fiber reinforcement. The frame was generally shaped in accordance with FIG. 2, and had a variable elliptical cross-section. In cross-section 2a—2a of FIG. 2, the major axis of the ellipse is roughly orthogonal to the plane of the seat frame, in other words, parallel to the front/rear axis of the vehicle in which the seat will be mounted. The foam mandrel has a major axis of 36 mm and a minor axis of 16 mm, around which is woven a thick braid of E-glass on a multiaxial weaving machine. A 45°/0°/0°/45° weave of E-glass is used, although many other configurations are of course possible. The total outside dimension with the glass in place across section 2a—2a is 40 mm in the major axis direction and 20 mm in the minor axis direction.

Toward the bottom opposed ends of the generally U-shaped frame, the shape of the mandrel is again elliptical, with the major and minor axes substantially the same as that of section 2a—2a. In any given frame, due to the flexibility of the multi-dimensional weaving, different portions of the frame may have cross-sections of different dimensions. The 45°/0°/0°/45° E-glass weave continues down to the bottom of the frame. On top of the fiberglass layer is slipped a carbon fiber woven sock having a thickness of 1.5 mm, and a 0°/45°/0° weave, giving a total minor dimension thickness of 23 mm for this area of the part and a major dimension thickness of 43 mm. During preparation of the foam mandrel, metal bushings having internal diameters of 12 mm are molded into the mandrel itself, these later facilitating pivoting attachment of the seat back frame to the seat proper, as well as attachment of the seat back adjusting mechanism. The assembly, with fiberglass braid, carbon fiber braid, and mounting bushings, is then inserted into an epoxy mold, the mold closed, and a thermoset epoxy composition based on Shell Epon® 828 epoxy resin injected and allowed to cure. In practice, a polyurethane polymer composition is believed more preferable, due to the shorter curing times possible. Such curable polyurethane systems are commercially available from Bayer, BASF Corporation, ARCO Chemicals, Dow, ICI, and other sources.

Figure 2C:
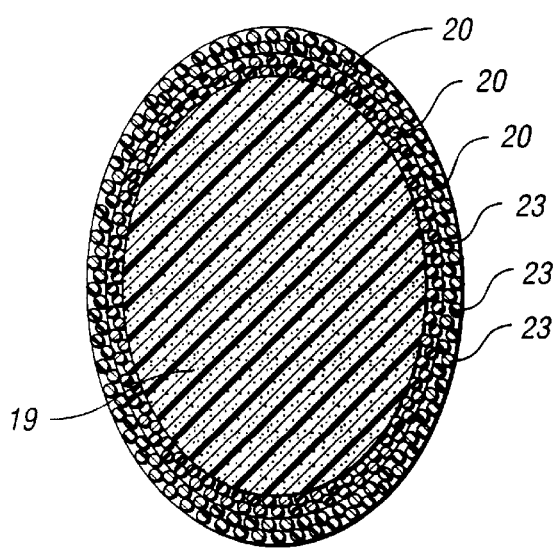
FIG. 2c is an illustration of an alternative embodiment taken across 2c—2c of FIG. 2.
Figure 3:
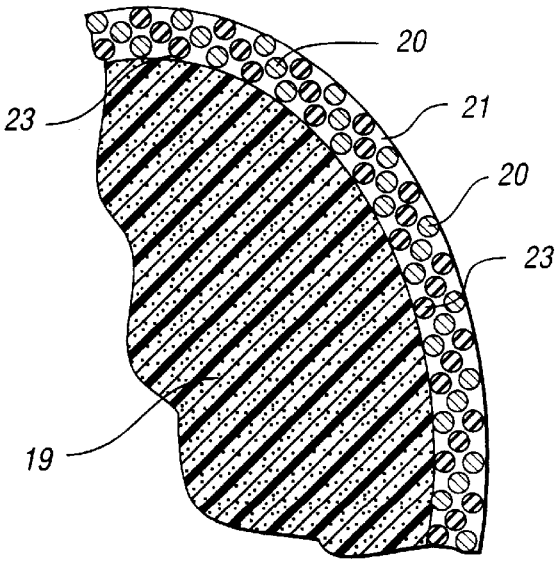
FIG. 3 is an enlarged section of FIG. 2c showing one placement of carbon fiber and glass fiber yarns or tows throughout a single braid.

In FIG. 2c, a cross-section of an alternative embodiment is shown where a more complicated multiaxial weaving machine weaves the attachment portion of the frame from both glass fibers and carbon fibers. The glass fibers 20 and carbon fibers 23 are interwoven at this point of the frame.

While the best mode for carrying out the invention has been described in detail, those familiar with the art to which this invention relates will recognize various alternative designs and embodiments for practicing the invention as defined by the following claims.

What is claimed is:

1. A fiber-reinforced composite seat back frame comprising a generally U-shaped back portion,
    said U-shaped back portion comprising a tubular braid of fiberglass, opposing ends of said back portion terminating in respective attachment portions;
    said attachment portions, comprising a tubular braid of carbon fibers;
    said tubular fiberglass braid and said tubular carbon fiber braid impregnated with a polymeric matrix resin to form a fiber/resin composite, said fiber/resin composite having an average of from about 30 volume percent to about 70 volume percent fibers.

2. The seat back frame of claim 1 wherein said tubular braid of fiberglass extends proximate the ends of said attachment portions, said tubular braid of fiberglass surrounded by said tubular braid of carbon fibers.

3. The seat back frame of claim 1 wherein said tubular braid of fiberglass extends proximate the ends of said attachment portions, said tubular braid of fiberglass surrounding said tubular braid of carbon fibers.

4. The seat back frame of claim 1 wherein said polymeric matrix resin is a thermoset matrix resin.

5. The seat back frame of claim 1 wherein said polymeric matrix resin is a thermoset matrix resin selected from the group consisting of polyurethane resins, epoxy resins, and unsaturated polyester resins.

6. The seat back frame of claim 1 further comprising at least one bushing positioned with each of said attachment portions of said frame.

7. The seat back frame of claim 6 wherein at least one of said tubular braids is woven by a multiaxial weaving machine about a mandrel, at least one of said at least one of bushing surrounded by an area of increased fiber weight and volume, said area of increased fiber weight and volume providing increased strength proximate said at least one of said at least one bushing.

8. The seat back frame of claim 1 wherein said tubular braid of fiberglass is a braid woven on a multiaxial weaving machine about a mandrel.

9. The seat back frame of claim 8 wherein said attachment portions of said generally U-shaped back portion are substantially hollow.

10. The seat back frame of claim 8 wherein said mandrel is a foam mandrel which forms a core of said seat back frame following impregnation of said braids with polymeric matrix resin.

11. The seat back frame of claim 10 wherein said mandrel contains hollow tubular metal portions at opposing ends thereof.

* * * * *

UNITED STATES PATENT AND TRADEMARK OFFICE
CERTIFICATE OF CORRECTION

PATENT NO.      : 6,059,369
DATED           : May 9, 2000
INVENTOR(S)     : Daniel J. Bateson et al.

It is certified that error appears in the above-identified patent and that said Letters Patent is hereby corrected as shown below:

Column 1,
Line 4, insert -- Related U.S. Application Data
This application claims the benefit of provisional application
No. 60/039,162, filed on February 26, 1997. --

Signed and Sealed this

Tenth Day of June, 2003

JAMES E. ROGAN
*Director of the United States Patent and Trademark Office*